(12) United States Patent
Blanco et al.

(10) Patent No.: US 8,350,907 B1
(45) Date of Patent: Jan. 8, 2013

(54) METHOD OF STORING DIGITAL VIDEO CAPTURED BY AN IN-CAR VIDEO SYSTEM

(75) Inventors: Louis W. Blanco, Boonton, NJ (US); Leo Lorenzetti, Hardyston, NJ (US)

(73) Assignee: L-3 Communications Mobile-Vision, Inc., Boonton, NJ (US)

( * ) Notice: Subject to any disclaimer, the term of this patent is extended or adjusted under 35 U.S.C. 154(b) by 2966 days.

(21) Appl. No.: 10/661,416

(22) Filed: Sep. 12, 2003

(51) Int. Cl.
*H04N 7/18* (2006.01)

(52) U.S. Cl. ...................................................... 348/143

(58) Field of Classification Search .................. 348/143; 340/539.1; 715/723
See application file for complete search history.

(56) References Cited

U.S. PATENT DOCUMENTS

| | | | |
|---|---|---|---|
| 4,789,904 A | 12/1988 | Peterson | 358/310 |
| 4,873,711 A | 10/1989 | Roberts et al. | 379/58 |
| 4,949,186 A | 8/1990 | Peterson | 358/355 |
| 5,012,335 A | 4/1991 | Cohodar | 358/108 |
| 5,111,289 A | 5/1992 | Lucas et al. | 358/108 |
| 5,491,464 A | 2/1996 | Carter et al. | 340/425.5 |
| 5,515,042 A | 5/1996 | Nelson | 340/937 |
| 5,568,510 A | 10/1996 | Tam | 375/202 |
| 5,617,086 A | 4/1997 | Klashinsky et al. | 340/907 |
| 5,677,979 A | 10/1997 | Squicciarini et al. | 386/46 |
| 5,764,685 A | 6/1998 | Tanaka et al. | 375/200 |
| 5,794,125 A | 8/1998 | Grad | 455/38.3 |
| 5,794,164 A | 8/1998 | Beckert et al. | 701/1 |
| 5,812,056 A | 9/1998 | Law | 340/539 |
| 5,938,717 A | 8/1999 | Dunne et al. | 701/117 |
| 6,002,326 A | 12/1999 | Turner | 340/426 |
| 6,037,977 A | 3/2000 | Peterson | 348/148 |
| 6,081,264 A * | 6/2000 | Rosen et al. | 715/723 |
| 6,181,373 B1 | 1/2001 | Coles | 348/158 |
| 6,211,907 B1 | 4/2001 | Scaman et al. | 348/148 |
| 6,262,764 B1 | 7/2001 | Peterson | 348/148 |
| 6,275,773 B1 | 8/2001 | Lemelson et al. | 701/301 |
| 6,346,890 B1 | 2/2002 | Bellin | 340/825.52 |
| 6,389,340 B1 | 5/2002 | Rayner | 701/35 |
| 6,469,735 B2 | 10/2002 | Coles | 348/158 |
| 6,487,500 B2 | 11/2002 | Lemelson et al. | 701/301 |
| 6,518,881 B2 | 2/2003 | Monroe | 340/539 |
| 6,542,076 B1 | 4/2003 | Joao | 340/539 |
| 6,542,077 B2 | 4/2003 | Joao | 340/539 |
| 6,574,314 B1 | 6/2003 | Martino | 379/93.17 |
| 6,587,046 B2 | 7/2003 | Joao | 340/539.14 |
| 6,587,152 B1 | 7/2003 | Sharp et al. | 348/373 |
| 6,675,006 B1 | 1/2004 | Diaz et al. | 455/404.1 |
| 6,681,195 B1 | 1/2004 | Poland et al. | 702/142 |
| 6,683,526 B2 | 1/2004 | Bellin | 340/3.43 |
| 6,696,978 B2 | 2/2004 | Trajkovic et al. | 340/936 |

(Continued)

FOREIGN PATENT DOCUMENTS

JP 05183788 A 7/1993

*Primary Examiner* — Allen Wong
(74) *Attorney, Agent, or Firm* — Mayer & Williams PC; Mark K. Young, Esq.

(57) ABSTRACT

A method of storing digital video is provided where an original video clip is selected, according to selection criteria, from video clips stored on a digital storage medium. The frame rate associated with the selected video clip is lowered and a downgraded version of the original video clip is written to a digital storage medium at the lowered frame rate. The original video clip may then be overwritten or erased to thereby reduce the storage space requirements for the downgraded video clip by approximately the percentage reduction in downgraded frame rate.

19 Claims, 4 Drawing Sheets

U.S. PATENT DOCUMENTS

| | | | |
|---|---|---|---|
| 6,831,556 B1 * | 12/2004 | Boykin | 340/539.1 |
| 2001/0001561 A1 | 5/2001 | Coles | 348/158 |
| 2001/0010490 A1 | 8/2001 | Bellin | 340/7.46 |
| 2001/0034768 A1 | 10/2001 | Bain et al. | 709/206 |
| 2002/0003571 A1 | 1/2002 | Schofield et al. | 348/148 |
| 2002/0036565 A1 | 3/2002 | Monroe | 340/425.5 |
| 2002/0041240 A1 | 4/2002 | Ikeda et al. | 340/993 |
| 2002/0095601 A1 | 7/2002 | Hind et al. | 713/201 |
| 2002/0101509 A1 | 8/2002 | Slomski | 348/143 |
| 2002/0121969 A1 | 9/2002 | Joao | 340/425.5 |
| 2002/0131768 A1 | 9/2002 | Gammenthaler | 386/107 |
| 2003/0008662 A1 | 1/2003 | Stern et al. | 455/456 |
| 2003/0016130 A1 | 1/2003 | Joao | 340/539 |
| 2003/0016834 A1 | 1/2003 | Blanco et al. | 381/91 |
| 2003/0036825 A1 | 2/2003 | Kim | 701/1 |
| 2003/0052970 A1 | 3/2003 | Dodds et al. | 348/148 |
| 2003/0067541 A1 | 4/2003 | Joao | 348/148 |
| 2003/0067542 A1 | 4/2003 | Monroe | 348/148 |
| 2003/0071899 A1 | 4/2003 | Joao | 348/148 |
| 2003/0080713 A1 | 5/2003 | Kirmuss | 320/150 |
| 2003/0080878 A1 | 5/2003 | Kirmuss | 340/936 |
| 2003/0081121 A1 | 5/2003 | Kirmuss | 348/143 |
| 2003/0081122 A1 | 5/2003 | Kirmuss | 348/148 |
| 2003/0081123 A1 | 5/2003 | Rupe | 348/148 |
| 2003/0081127 A1 | 5/2003 | Kirmuss | 348/207.99 |
| 2003/0081128 A1 | 5/2003 | Kirmuss | 348/207.99 |
| 2003/0081934 A1 | 5/2003 | Kirmuss | 386/46 |
| 2003/0081935 A1 | 5/2003 | Kirmuss | 386/46 |
| 2003/0086000 A1 | 5/2003 | Siemens et al. | 348/148 |
| 2003/0087636 A1 | 5/2003 | Mazzara et al. | 455/426 |
| 2003/0095688 A1 | 5/2003 | Kirmuss | 382/105 |
| 2003/0112929 A1 | 6/2003 | Chuang | 379/88.13 |
| 2003/0151663 A1 | 8/2003 | Lorenzetti et al. | 348/148 |
| 2003/0159044 A1 | 8/2003 | Doyle et al. | 713/176 |
| 2003/0185296 A1 | 10/2003 | Masten, Jr. | 375/240.01 |
| 2003/0193404 A1 | 10/2003 | Joao | 340/825.71 |
| 2003/0206102 A1 | 11/2003 | Joao | 340/539.1 |
| 2003/0210328 A1 | 11/2003 | Mazzilli | 348/148 |
| 2003/0218551 A1 | 11/2003 | Crocker et al. | 340/905 |
| 2004/0008255 A1 | 1/2004 | Lewellen et al. | 348/148 |
| 2004/0013192 A1 | 1/2004 | Kennedy | 375/240 |
| 2004/0036601 A1 | 2/2004 | Obradovich | 340/540 |
| 2004/0070515 A1 | 4/2004 | Burkley et al. | 340/825.49 |
| 2004/0075547 A1 | 4/2004 | Vojtech et al. | 340/500 |
| 2004/0145457 A1 | 7/2004 | Schofield et al. | 340/425.5 |
| 2004/0146272 A1 | 7/2004 | Kessel et al. | 386/46 |
| 2004/0150717 A1 | 8/2004 | Page et al. | 348/148 |
| 2004/0155781 A1 | 8/2004 | DeOme | 340/573.1 |
| 2004/0160319 A1 | 8/2004 | Joao | 340/539.1 |
| 2004/0177253 A1 | 9/2004 | Wu et al. | 713/176 |
| 2004/0189803 A1 | 9/2004 | Price | 348/151 |
| 2004/0201765 A1 | 10/2004 | Gammenthaler | 348/333.01 |

* cited by examiner

METHOD OF STORING DIGITAL VIDEO CAPTURED BY AN IN-CAR VIDEO SYSTEM

BACKGROUND OF THE INVENTION

This invention is related generally to surveillance systems, and more particularly to a method of storing digital video captured by an in-car video system.

Vehicle-mounted surveillance systems, also termed in-car video systems, are seeing increased use in the security industry and law enforcement community as an effective means to provide an indisputable video and audio record of encounters involving officers and citizens. In these systems, a video camera is typically mounted on the police car's dashboard or windshield and is generally arranged to have a field of view of the area to the immediate front of the car. The field of view approximately corresponds to what an officer would see when seated in the car's front seat. The video camera is operably coupled to a recording device, such as a video cassette recorder ("VCR") or digital video recorder ("DVR"), mounted in the police car, often in the trunk.

In-car video systems generally employ a wireless microphone carried on the person of a law enforcement officer to record an audio soundtrack that accompanies the visual scene captured on the video recording. The audio soundtrack is an extremely valuable complement to the recorded video because it acts as a transcript of what was said, by whom and when. In some cases, the audio soundtrack is more valuable as evidence than the visual record because issues pertaining to consent, admissions, and state-of-mind of the suspect and/or officer (to cite just a few examples) may be resolved more effectively by the audio record. In some systems, additional wired microphones may be deployed in other locations within the car, such as the rear-seat passenger area, to record sounds and conversations emanating from those locations.

A video recording may be started manually by the officer, or in some systems, the video recording is started automatically when, for example, the officer activates the police car's emergency systems (such as overhead lights and/or sirens), vehicle doors are opened, or when a vehicle speed-measuring radar unit is operated. The incident is recorded on video until the system is either manually or automatically switched off.

In-car video systems serve to enhance prosecution of traffic, DWI/DUI and controlled dangerous substances offenses (to name just a few) by contributing detailed graphical and auditory evidence in a time-sequential manner that is inherently unbiased and objective. Such evidence is a valuable adjunct to eyewitness and officer testimony. In addition, as with other quality-improvement initiatives where conduct is surveyed and recorded, in-car video system usage has been shown to assist in the maintenance of high professional standards among law enforcement personnel. Police-community relations have improved and citizen complaints of police misconduct have lessened in many jurisdictions where in-car video systems are used, often as a result of the inherently high-quality evidence provided by such systems. Videos taken with in-car video systems are also valuable training aids to law enforcement personnel.

Video evidence is protected (and the evidentiary chain of custody readily established) because the video recorder and video recording medium are typically "locked", often both mechanically and electronically, within a tamperproof security enclosure in the car (e.g., the trunk) that is only accessible by law enforcement command personnel. In addition, the in-car systems are configured to prevent erasure or over-recording of a recorded incident to ensure the integrity of the video evidence. In-car video systems may superimpose time and date stamps on the recorded video image as a further enhancement to the evidentiary strength of the video recording. In addition to date and time, other data, collectively referred to as "incident markers" such as the indication of the use of emergency lights and sirens, door opening and closures, vehicle speeds and other indicators may be recorded.

In-car video systems have historically been based on analog videotape technology. All video and audio sources (i.e., camera and microphones) are thus recorded on videotape. Once that videotape is full, it is removed and stored for a period of time determined by the requirements of the particular police department. That period may be days, weeks or years. As a result, even a small department may face storing a large number of tapes, perhaps several thousand or more, at any given time. Larger departments face an even larger tape storage problem.

While current videotape-based in-car video systems perform very well in many applications, digital video recording technology—where video is recorded to a computer-type media such as a hard disk drive by a DVR—may be utilized in other applications to realize several potential advantages. These include, for example, the ability to access (and very rapidly) any portion of the recording for incident review, improved reliability of digital media compared to tape mechanisms, better and more consistent image quality, and the lack of degradation of new images and audio when recorded over the top of the old ones.

One of the challenges presented from digital video storage is the amount of long term storage that is typically required in most applications. For example, one hour of VHS quality full motion, 30 frames per second, video requires approximately 1 gigabyte of digital storage. Thus, for each six-hour (i.e., T-120) VHS tape utilized, approximately six gigabytes of digital storage is required. The storage requirements for an agency differ greatly due to the varied length of time the video is required to be held. For example, some agencies save videos for 90 days unless there is an incident associated with the recording. Once the 90 days has elapsed, the videotape is typically erased and reused. Thus, a department with 20 cars producing eight hours of video per day per car would require approximately 14,400 gigabytes of digital storage. Storage requirements of such magnitude have significantly impacted the affordability of digital video recording systems.

SUMMARY OF THE INVENTION

A method of storing digital video is provided where a video clip is selected, according to one or more selection criteria, from video clips stored on a digital storage medium. The frame rate associated with the selected video clip is lowered and a downgraded version of the video clip is written to a digital storage medium at the lowered frame rate.

In an illustrative embodiment of the invention, the video clip is selected according to the length of time the video clip has been stored on the digital storage medium. A downgraded version is created (having a lowered frame rate) and stored to a digital storage medium. The original video clip may then be overwritten or erased to thereby reduce the storage space requirements for the downgraded video clip by approximately the percentage reduction in downgraded frame rate.

The video clips may be downgraded in a chronological sequence to maintain a desired amount of free space on the digital storage medium. Accordingly, the oldest stored video clips are downgraded first, as required, once a predetermined usage threshold is reached and additional new video clips are recorded onto the digital storage medium. The downgrading process may be implemented by an in-car video system, or at a digital storage device such as a server that is remotely located from the in-car video system, depending on the requirements of the application.

Users may select certain videos (e.g., "important" or otherwise significant recorded incidents) to be exempt from the downgrade process regardless of the video clip's age in some applications. The level of downgrading (i.e., reduction in frame rate) may be selectable by a user in some applications, and the downgrading may also be performed step-wise (for example, first from 30 frames-per-second to 20 fps, and then from 20 fps to 10 fps, as required to maintain the desired level of free space on the digital storage medium). In this illustrative embodiment of the invention, the audio portion of the selected video clip may preferably be kept intact in its entirety in most applications and stored along with the downgraded image.

Advantageously, the inventive method enables the amount of recorded video stored within individual vehicles to be substantially increased. Agencies may be able to store many months of video inside the cars, to thereby negate or lessen the need for expensive storage hardware and complex processes to be implemented within the agency.

DETAILED DESCRIPTION

Digital video recording systems available today operate in a very similar manner to their videotape counterparts. One or more cameras and one or more microphones feed into a DVR and the recorded video is stored on a digital storage medium. Thus, instead of videotape, a hard disk drive (functionally similar to those used in personal computers) is typically used for storage. Long-term storage can be achieved in several ways.

Figure 1:
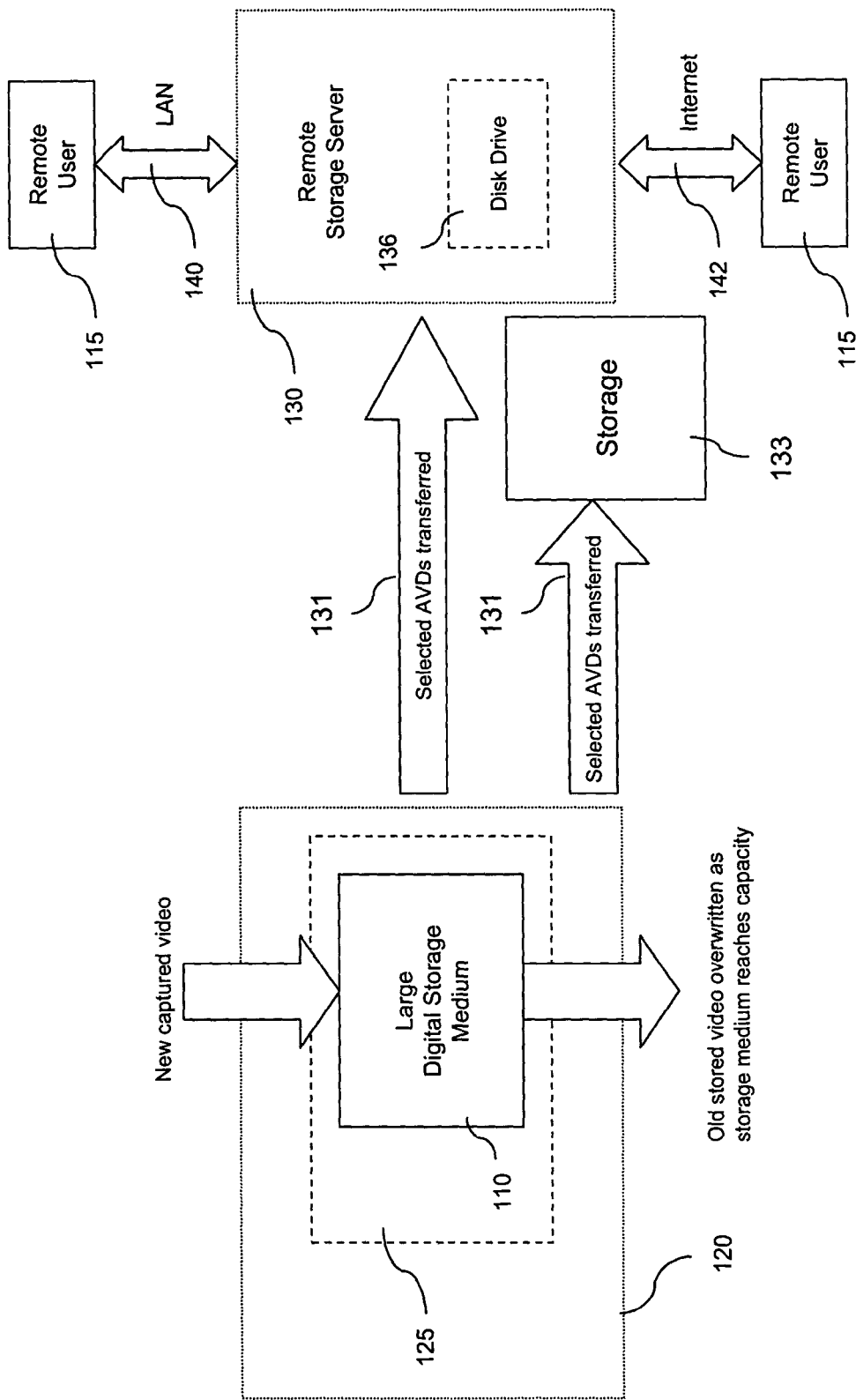
FIG. 1 is a simplified functional block diagram of a first method of long term video storage.

Referring to FIG. 1, which provides a simplified block diagram of a first method of long term video storage, a large digital storage medium 110 (for example, a hard disk drive having storage capacity of greater than 50 gigabytes) is utilized in a vehicle 120, such as a police cruiser, to record and store many hours of video. Typically, the large digital storage medium 110 would be incorporated into an in-car video system, designated by reference number 125 in FIG. 1 which typically includes a DVR, camera, microphone, control unit and monitor (not shown in FIG. 1). Thus, the digital storage medium 110 functions with regard to the DVR the same way a videotape functions relative to a VCR.

Once the large digital storage medium 110 reaches its maximum capacity, the oldest video is erased (i.e., overwritten) and its space is taken by the newest video as shown in FIG. 1. All storage is typically maintained in individual vehicles, and not externally at the agency or department. However, selected video recordings, for example those designated as being of interest or of other importance, may be transferred to conventional storage media such as compact disc ("CD") or digital versatile disc ("DVD"), removable hard disk drive or any other removable media (collectively designated by reference numeral 131 in FIG. 1). The media 131 containing such selected video recordings may be saved by placing the digital storage medium 110 in storage 133, or the video data may be transferred or copied to a remote storage server 130 as shown in FIG. 1. In some applications of the invention, the large digital storage medium 110 may be completely removed from the vehicle 120 when full and stored. The full digital storage medium may then be replaced in the vehicle's in-car video system by an empty one.

In this illustrative method as well as the other described below, the storage server 130 may be a stand-alone personal computer with on board storage and a CD or DVD burner (not shown in FIG. 1). The storage server 130 may also take the form of a network storage unit that allows access by a remote user 115 to the stored video via a local area network 140 ("LAN") or Internet connection 142. In some applications of the invention, such system access may be controlled down to the individual user and/or the video data such users are allowed to access.

Figure 2:
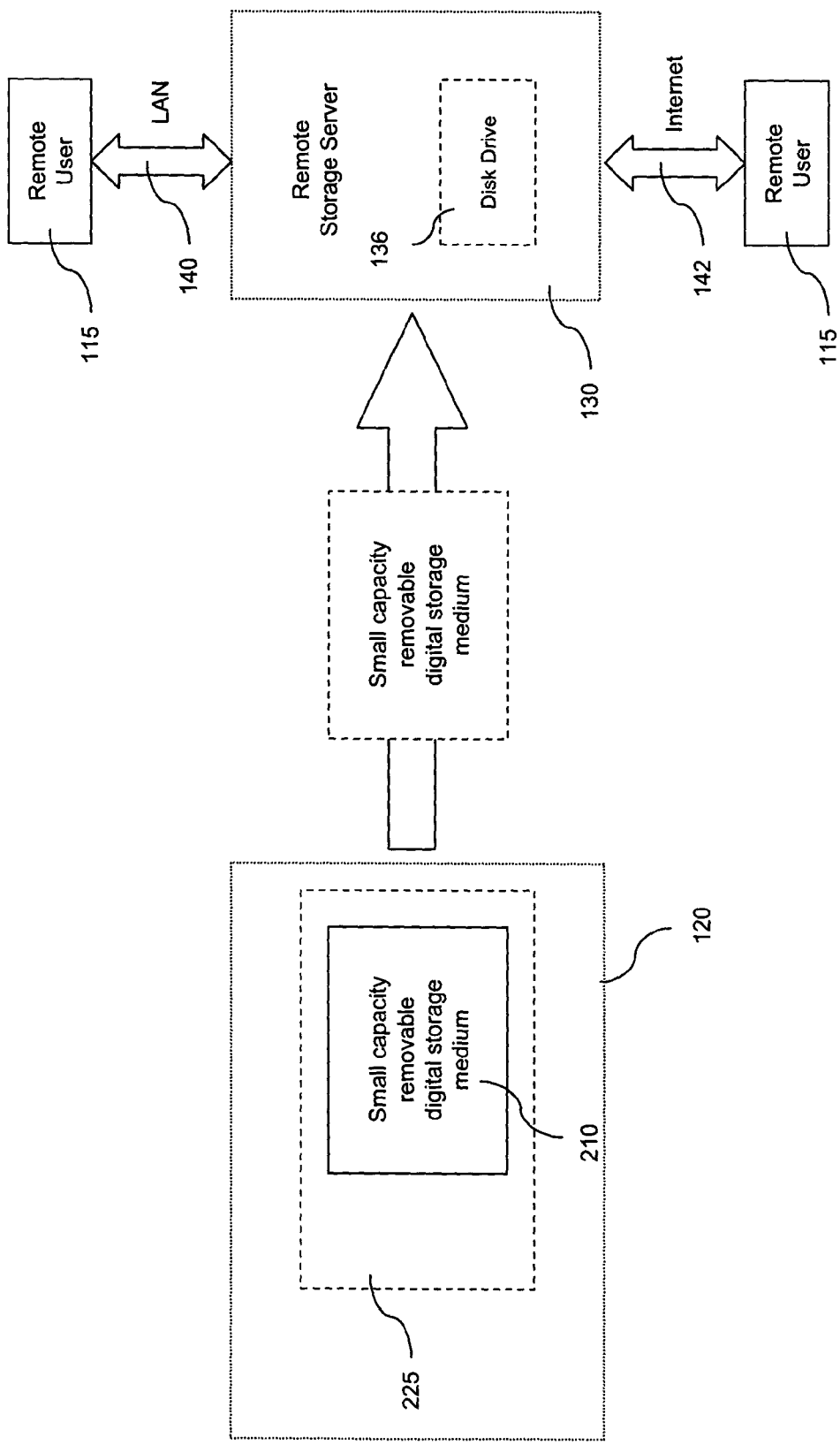
FIG. 2 is a simplified functional block diagram of a second method of long term video storage.

As shown in FIG. 2, a second method for long term storage utilizes a smaller removable storage medium 210 within in-car video system 225 installed within vehicle 120. Removable storage medium 210 may be implemented, for example using one to five gigabytes of storage, as provided by such devices as an IBM 1 GB MicroDrive hard drive. Typically, the removable storage medium 210 would be removed from the vehicle 120 at every shift and the video data transferred to a remote storage server 130 that is often located within an agency. Transferring the video data to remote storage server 130 provides easy access to the saved video as well as allowing the removable medium 210 to be put back into field use (i.e., recycled).

Such methodology also allows users located remotely from the vehicle 120 to search for video clips using a number of pointers or search fields. For example, police vehicle number, officer badge or other identifying number, officer name, date, time may be used as search criteria, either individually, or in combination. The occurrence of external triggers or incidents markers such as the emergency Lights, Siren, Car door opening, etc., that may be part of the video record, may also be searched in some applications of the invention.

Figure 3:
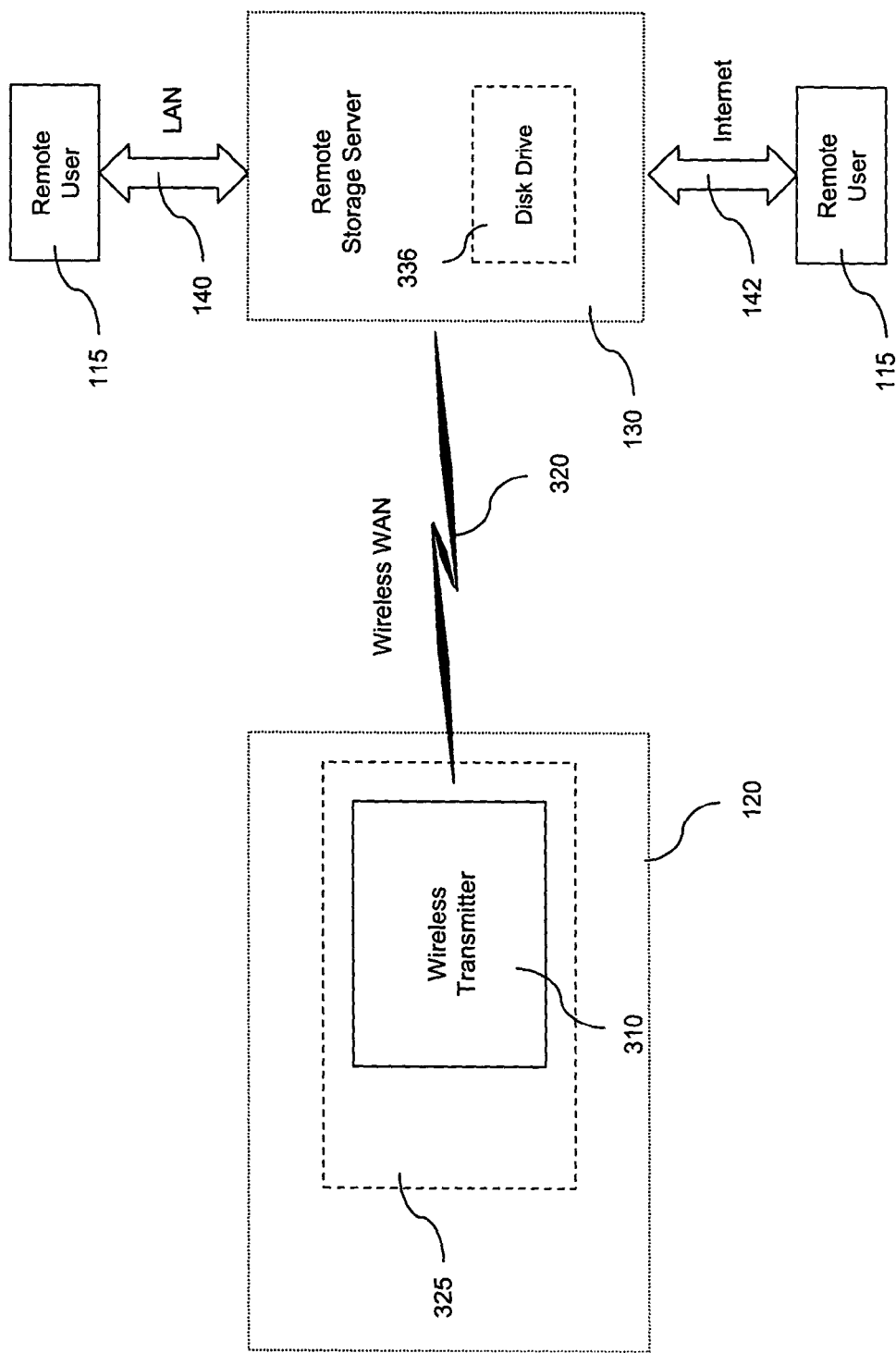
FIG. 3 is a simplified functional block diagram of a third method of long term video storage.

In a third method of long term video storage depicted in FIG. 3, the removable media may be replaced with a wireless link, enabled for example, through the use of a wireless transmitter 310 as shown. In such a methodology, the video is transferred whenever the car is within range of an applicable WAN 320. The video data is transferred to a storage server 130 coupled to the WAN. Accessibility by personnel 115 may be provided via LAN and Internet connections, 140 and 142 respectively, as shown.

The third method described above is often the most advantageous in many applications. It often requires the least amount of interaction from the officer which can be desirable from the viewpoint of training reduction and enhanced evidence preservation. However, it may be a more difficult method to employ in practice due to the large amounts of data required for video storage.

Figure 4:
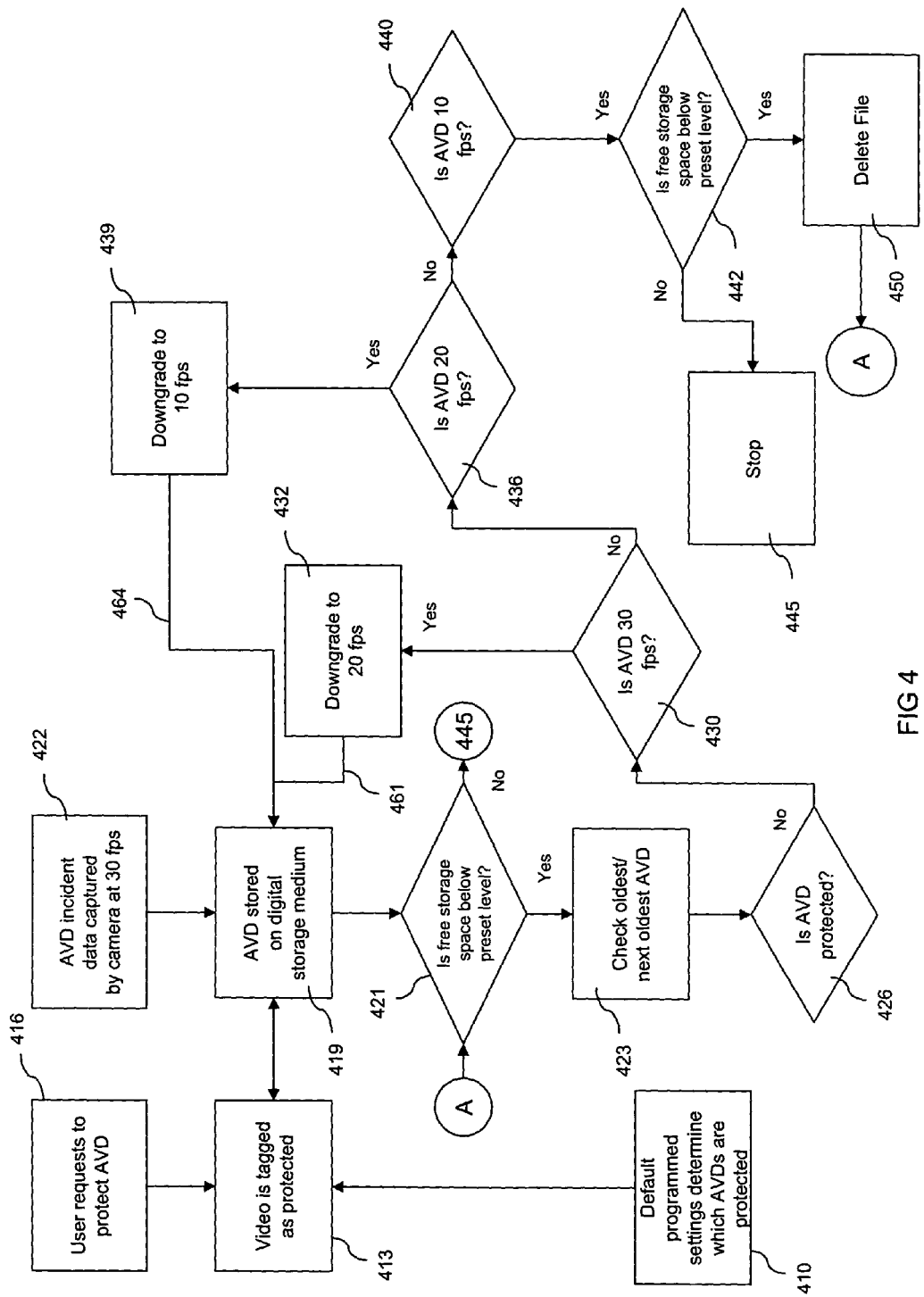
FIG. 4 is a flow chart of an illustrative process for selectively downgrading the frame rate of selected video clips.

Turning now to FIG. 4, a flow chart of an illustrative process for selectively downgrading the frame rate of selected video clips is shown. As shown in block 422 of FIG. 4, AVD pertaining to a particular incident is captured by a camera and associated microphones. The frame rate in most applications will be 30 frames-per-second ("fps") which is the conventionally accepted frame rate for full motion video. "AVD," as the term is used generally means a combination of video images plus audio as typically captured by the cameras and microphones used in most in-car video systems. It is noted, however, that some applications may be suited to the use of either video or audio separately. The principles of the invention may be beneficially applied to each of these situations and, accordingly, the term AVD as used herein may mean audio and video data, alone or in combination. A digital storage medium such as a hard disk drive (for example, those identified by reference numerals 110, 210 or 336 in FIGS. 1-3, respectively) stores the AVD, as indicated by block 419.

A typical user of the method described here could be a police officer using an in-car video system incorporating the inventive principles. It may be possible for an officer to feel that a particular video recording of an incident should be saved some reason and tag it as protected and thus exempt from the downgrading process. Such a request to protect the AVD associated with captured incidents is shown in block 416 of FIG. 4.

An alternative method to protect AVD from being downgraded is indicated by block 410. In this method, the occurrence of one or more predetermined criteria will determine in advance which AVD is protected. A user of this alternative method of protection could be a command staff member of a police department or administrator. Policy, or other reasons, may dictate for example, that all video recordings of all traffic stops involving the issuance of summons never be downgraded or erased and the individual officer should not be provided discretion regarding AVD meeting such criteria. This "default" exempt status for certain AVD meeting predetermined criteria is indicated by block 410 in FIG. 4.

As new video clips are captured and written to the hard disk drive in block 419, the digital storage medium fills until it reaches a predetermined threshold as shown at block 421. For example, a particular digital storage medium could be set up so that at least 10% free storage space is available at any given time. If the storage of the new captured video does not cause the free storage space to fall below the preset level, then control is passed to block 445 and no action is taken. If the storage does result in less free storage space than desired, at block 423 in FIG. 4, the oldest video clip stored in the digital storage medium (representing the earliest recorded incident in time) becomes a candidate for downgrading to a lower frame rate.

It is noted that the criteria of age is merely illustrative as some video clips may be candidates for downgrading based on other criteria, depending on the requirements of the application. For example, some agencies may record video as soon as emergency lights on the police cruiser are activated (such as when an officer is in transit to a call under emergency condition). In such circumstances it may be possible that no evidence of any value is recorded because the incident to which the officer was responding occurred out of camera view, for example, a first aid call for a heart attack victim in a hotel room. Therefore, it may be desirable to downgrade video recordings having limited evidentiary value irregardless of age.

To maintain the desired free space on the digital storage medium, in an illustrative example, the oldest video clip is converted from 30 fps to an arbitrary lower rate (for example, 15 fps or less as may be determined by the agency). Alternatively, as shown in FIG. 4 in blocks 423-440, a step-wise downgrade approach may also be used to convert the video from higher to successively lower frame rates in an iterative manner, for example 30 fps to 20 fps and then to 10 fps. The step-wise approach may be taken to successively downgrade the AVD over some selected time interval. Accordingly, the very oldest AVDs are downgraded and stored at the lowest frame rate, the newest AVDs are stored at the full frame rate, and the AVDs in between the oldest and newest are downgraded and stored at an intermediate frame rate.

Returning back to FIG. 4, as shown at block 423-426, if the oldest AVD is not protected (via the tagging process described above), then process control passes to block 430. If the AVD is currently at 30 fps, then as shown in block 432, the AVD is downgraded to 20 fps and the downgraded AVD is written to the digital storage medium as indicated by line 461. The original AVD (i.e., the version on which the downgraded version is based) is then marked as free to be overwritten (for example, by downgraded AVDs or new video recordings) or erased from the digital storage medium as indicated by block 450 if additional space is required to maintain the preset level on the digital storage medium.

As indicated in block 436 of FIG. 4, if the AVD is currently at 20 fps (having been previously downgraded in an earlier iteration), then it is downgraded again to 10 fps. The downgraded AVD is written to the digital storage medium as indicated by line 464. The original AVD (i.e., the 20 fps version on which the downgraded version is based) is then marked as free to be overwritten or erased from the digital storage medium. Such overwriting or erasure of the original AVD thus frees up additional storage space on the digital storage medium.

At block 440, once the AVD is finally downgraded to 10 fps, a check at block 442 is performed to determine if the free storage space is below the preset level. If so, then process control returns to block 421, as shown, and the process iterates with the next oldest stored AVD. The process continues in an iterative manner until the desired free space on the digital storage medium is achieved.

Other features of the invention are contained in the claims that follow.

What is claimed is:

1. A method of storing a video clip captured using an in-car video system, the video clip having an associated frame rate, the method comprising the steps of:
    selecting a video clip from video clips stored on a digital storage medium, where the step of selecting is performed according to a length of time a video clip has been stored on the digital storage medium; and
    downgrading the selected video clip so that a frame rate of the downgraded video clip is lower than a frame rate of the selected video clip prior to downgrading; and
    storing the downgraded video clip at the lower frame rate.

2. The method of claim 1 where the steps of selecting and downgrading are performed when a determination of current free space on the digital storage medium indicates that the current free space is below a threshold.

3. The method of claim 1 where the downgraded video clip is stored on the digital storage medium.

4. The method of claim 1 where the downgraded video clip is stored on a second digital storage medium.

5. The method of claim 1 where the step of downgrading is performed iteratively.

6. The method of claim 1 where the downgraded video clip is performed step wise.

7. The method of claim 1 where the steps of selecting and downgrading are performed iteratively so that video clips stored on the digital storage medium are downgraded in a chronological sequence.

8. The method of claim 1 where the frame rate of the downgraded video clip is user selectable.

9. The method of claim 1 where the step of downgrading is performed in an in-car video system located in a vehicle.

10. The method of claim 1 where video clips stored on the digital storage medium are exempted from the step of downgrading according to user-defined exemption criteria.

11. The method of claim 1 where the step of selecting is further performed according to an evidentiary value of a video clip.

12. A method of operating a digital storage medium used to store video clips of scenes captured by a camera, the video clips each having an associated frame rate and being chronologically stored on the digital storage medium from oldest to youngest, the method comprising the steps of:
   downgrading the oldest video clip to a lower associated frame rate to thereby reduce the amount of space required to store the oldest video clip; and
   storing the downgraded video clip at the lower associated frame rate on the digital storage medium.

13. The method of claim 12 where the step of downgrading is performed when free space on the digital storage medium falls below a threshold.

14. The method of claim 12 further including a step of iteratively performing the downgrading step to maintain a level of free storage of the digital medium.

15. The method of claim 14 where the level of free storage of the digital storage medium is preset.

16. The method of claim 12 further including the step of overwriting the oldest video clip with a new video clip.

17. A digital video storage system, comprising:
   a digital storage medium; and
   a processor for downgrading digital video clips of scenes captured by an in-car video system camera, the video clips each having an associated frame rate and stored on the digital storage medium so that a frame rate of the downgraded video clips is lower than a frame rate of the selected video clips prior to downgrading,
   wherein the video clips selected to be downgraded by said processor are selected according to a length of time a video clip has been stored on said digital storage medium.

18. The digital video storage system of claim 17 further including a user interface for selectively exempting video clips from downgrading by the processor.

19. The digital video storage system of claim 17 further including a user interface for selectively setting the frame rate of the downgraded video clip.

* * * * *